Oct. 2, 1951     W. VAN B. ROBERTS     2,569,691
IMPEDANCE MEASURING
Filed July 27, 1948
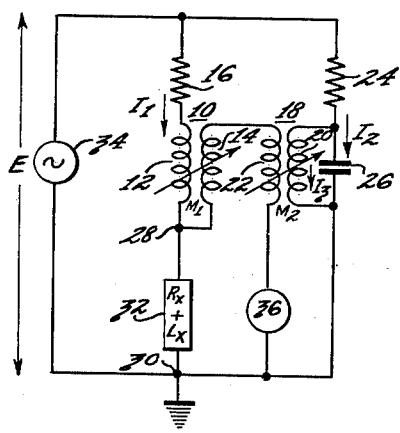
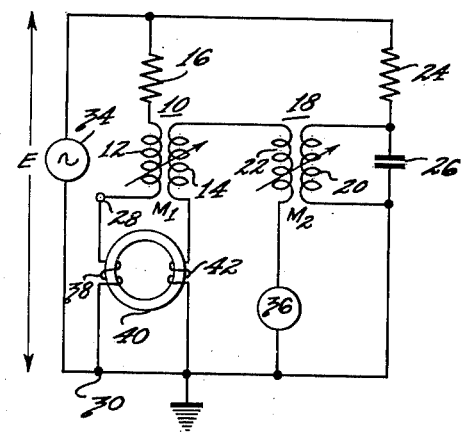
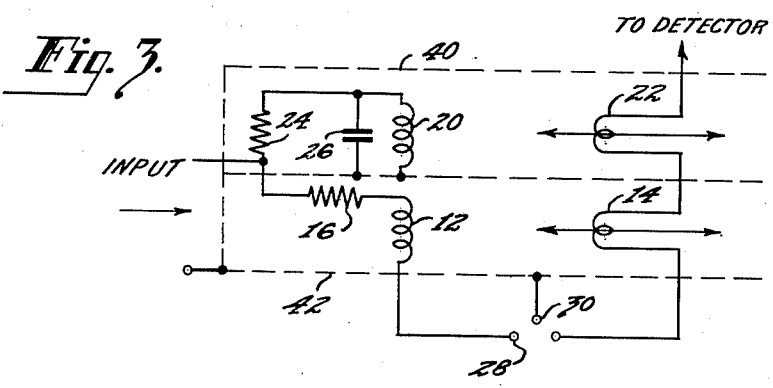
INVENTOR
WALTER VAN B. ROBERTS
BY
ATTORNEY Patented Oct. 2, 1951

2,569,691

UNITED STATES PATENT OFFICE 2,569,691

IMPEDANCE MEASURING

Walter van B. Roberts, Princeton, N. J., assignor to Radio Corporation of America, a corporation of Delaware Application July 27, 1948, Serial No. 40,913

9 Claims. (Cl. 175—183)

1

This invention relates to improvements in impedance measuring, and more particularly to an improved method and device for measuring the resistive and reactive components of unknown impedances, as well as for measuring the loss angle of paramagnetic core material.

Devices for measuring the resistive and reactive components of impedances generally require the adjustment of at least two variable elements, the adjustment of one element giving the desired information as to the resistive component and the adjustment of another element giving the desired information as to the reactive component of the impedance. In many such devices, as in those of the bridge type, for example, the variable elements are so interrelated that a series of adjustments are necessary before the final settings are obtained. Stated somewhat differently, each adjustment may be dependent on another adjustment, so that the final settings of the variables are obtained only after a series of trial and error settings. A further limitation on prior art devices of this kind is often found in the matter of frequency range, and correction factors or calibration adjustments are usually necessary if the device is used outside a rather narrow band of frequencies. Moreover, it is common practice to use variable resistors as the adjustable elements in bridge type impedance measuring instruments, and variable resistors which are accurate and otherwise suitable for use at radio frequencies are expensive and difficult to construct.

A further measuring problem which may be mentioned is that of determining the loss angle of paramagnetic core material by means of impedance measurements made with test windings placed on the sample being tested. In this case, the principal difficulty is to separate the effect due to resistance of the test windings from the effect due to flux lag in the core material.

It is a principal object of the present invention to provide an improved method and device for measuring the resistive and reactive components of impedances.

Another object is to provide an improved impedance measuring device in which adjustments of the variable elements are not interrelated.

A further object is to provide an improved impedance measuring device which may be used at any frequency within a relatively wide band of frequencies.

Another object is to provide an improved device for impedance measuring in which no variable resistors are required.

2

A still further object is to provide an improved method and device for determining the loss angle of magnetic cores, which device is not affected by the resistance of test windings and the like.

According to the invention, the foregoing and other objects and advantages are attained by the use of a pair of variable mutual inductance devices or vario-couplers, where a vario-coupler will be understood to mean two windings or inductors having variable mutual inductance between them. The primary circuits of the vario-couplers are connected in parallel with a source of alternating voltage, and the currents through the two primary windings are phased 90° apart by a phase shifting circuit. The secondary windings of the vario-couplers are connected in series, and since the primary currents are 90° out of phase, the voltages induced in the secondary windings may be used to balance the resistive and reactive components of voltages from other sources which may be directly or inductively supplied to the series connected secondary circuits of the vario-couplers.

A more complete understanding of the invention may be had by reference to the following description of illustrative embodiments, when read with the accompanying drawing, in which:

Figure 1 is a circuit diagram illustrating a basic form of the invention,

Figure 2 is a circuit diagram showing one modified form of the invention, and

Figure 3 shows schematically a preferred structural arrangement for circuits embodying the features of the invention.

Referring to the drawing, the circuit of Figure 1 is seen to include a first vario-coupler 10 having a primary winding 12 and a secondary winding 14 with variable mutual inductance $M_1$ therebetween. A resistor 16 is also shown as being in series with the primary winding 12 of the vario-coupler 10, although, as a practical matter, the resistance represented by the resistor 16 will ordinarily be the resistance of the primary winding 12. Terminals 28 and 30 are provided, whereby an unknown impedance 32 may be connected in circuit with the primary winding 12, and the series combination of the unknown impedance 32 and the primary winding 12 of the vario-coupler 10 are connected across a source of voltage 34.

A second vario-coupler 18 is also provided, having a primary winding 20 and a secondary winding 22 with variable mutual inductance $M_2$ therebetween. The primary circuit of the vario-coupler 18, which includes a resistor 24 connected in series with the primary winding 20 and a capacitor 26 connected in parallel with the primary winding 20, is also connected across the voltage source 34.

The secondary windings 14 and 22 of the vario-couplers are connected across the terminals 28, 30 of the impedance 32 in series with a detector 36, such as an ammeter or the like.

The principle of operation for the circuit of Figure 1 may be explained as follows: Representing the voltage of the source 34 as E, of frequency $\omega$, and assuming that the magnitude of the impedance 32, is very small compared with the impedance of the resistance 16 and the primary winding 12, as represented by $R_1$ and $j\omega L_1$, respectively, then the current $I_1$, through the primary winding 12 and the unknown 32, may be represented by the expression $$(1) \qquad I_1 = \frac{E}{R_1 + j\omega L_1}$$

Also, if the primary winding 20 of the variocoupler 18 is very much too large to resonate with the capacitor 26 at the frequency $\omega$, then the current $I_2$ through the resistor 24 (of resistance $R_2$) and the capacitor 26 (of capacitance C) may be expressed as $$(2) \qquad I_2 = \frac{E}{R_2 + \frac{1}{j\omega C}}$$

The current measured by the detector 36 will be due to three voltages: (1) the voltage $I_1(R_x + j\omega L_x)$ across the unknown impedance 32, where $R_x$ and $j\omega L_x$ are the resistive and the reactive components, respectively, of the unknown impedance; (2) the voltage $I_1 j\omega M_1$ induced in the secondary winding 14 of the vario-coupler 10; and (3) the voltage $I_3 j\omega M_2$ induced in the secondary winding 22 of the vario-coupler 18, where $I_3$ is the current through the primary winding 20. The reactive component $I_1 j\omega L_x$ of the voltage across the impedance 32 will be 90° out of phase with the current $I_1$ through the impedance 32, and since the voltage $I_1 j\omega M_1$ which will be induced in the secondary winding 14 through the mutual inductance $M_1$ will also be 90° out of phase with the current $I_1$, then the mutual inductance $M_1$ may be adjusted so that the induced voltage $I_1 j\omega M_1$ will balance the reactive component $I_1 j\omega L_x$ of the voltage across the unknown impedance 32, whereupon $$(3) \qquad I_1 j\omega M_1 = I_1 j\omega L_x$$

from which it will be seen that $$(4) \qquad M_1 = L_x$$

Thus, when $M_1$ is adjusted for minimum current through the detector 36, the setting of $M_1$ will give the value of the reactive component $L_x$ of the impedance 32.

The resistive component $R_x$ of the impedance 32 may be determined in a similar manner by adjusting the mutual inductance $M_2$ to give minimum current through the detector 36. The resistive component $I_1 R_x$ of the voltage across the unknown 32 will be in phase with the current $I_1$, and if the voltage $I_3 j\omega M_2$ induced in the winding 22 is in proper phase to balance the resistive component of the voltage across the impedance 32, the magnitude of the resistive component $R_x$ can be directly determined from the setting of $M_2$.

From Equation 1, it will be observed that the tangent of the phase angle between the current $I_1$ through the primary winding 12 of the vario-coupler 10 and the input voltage E will be equal to $$\frac{\omega L_1}{R}$$

and from Equation 2 it will be seen that the tangent of the phase angle between the current $I_2$, through the resistance 24 and the capacitor 26, and the voltage E, will be equal to $$\frac{1}{\omega C R_2}$$

It is well known that if the sum of any two angles A and B is equal to 90°, then the tangent of angle A is equal to the reciprocal of the tangent of angle B. Therefore, with the circuit of Figure 2 so arranged that $$\frac{\omega L_1}{R}$$

is equal to $\omega C R_2$, the two currents $I_1$ and $I_2$ will always be 90° out of phase at any frequency $\omega$. Since the current $I_3$ through the primary winding of the vario-coupler 18 will be substantially 180° out of phase with the current $I_2$ through the capacitor 26, the current $I_3$ will also be 90° out of phase with the current $I_1$. Therefore, the voltage $I_3 j\omega M_2$ induced in the secondary winding 22 of the vario-coupler 18 will be in proper phase to balance the resistive component $I_1 R_x$ of the voltage across the unknown 32. It can readily be shown that a balance between the resistive component $I_1 R_x$ of the voltage across the unknown and the induced voltage $I_3 j\omega M_2$ will be obtained when $R_x = \theta R_1$, where $\theta$ is the ratio of the voltage $I_3 j\omega M_2$ induced by the mutual inductance $M_2$ to the voltage $$\frac{I_2}{j\omega C}$$

across the capacitor 26. Hence, the variable mutual inductance $M_2$ can be calibrated directly in ohms to measure the resistive component of unknown impedances.

Referring, next, to Figure 2, a circuit in accordance with the invention is shown with which the loss of angle of paramagnetic core material can be measured without corrections or allowances being necessary for the resistance of test windings used. The circuit is seen to include a pair of vario-couplers 10 and 18 arranged in a manner quite similar to the circuit of Figure 1. In this modification, the impedance to be measured is connected in circuit with the primary winding 12 by means of an auxiliary primary winding 38 wound on the core 40 (the loss angle of which is to be determined), while an auxiliary secondary winding 42 is also wound on the core 40. The primary winding 38 is connected in series with the primary winding 12 of the vario-coupler 10 across the voltage source 34, while the secondary winding 42 is connected in series with the secondary windings 14 and 22 of the vario-couplers and with the detector 36.

In Figure 2, since there is no direct connection between the detector circuit and the primary circuits of the vario-couplers, the only voltages acting in the detector circuit will be induced voltages. If there were no "flux lag" in the core 40, then the voltage induced in the secondary winding 42 through the core 40 would be exactly 90° out of phase with the current through the primary winding 38. Such purely "reactive" voltage induced in the winding 42 can be completely balanced by the voltage induced in the secondary winding 14 of the vario-coupler 10 by adjustment of the mutual inductance $M_1$. However, losses in the core 40 will be effective to produce a "resistive" component of voltage in the winding 42, which will be in phase with the primary current. This resistive component of voltage in the winding 42 will be substantially independent of the resistance of the winding 38, and may be balanced out by adjusting the mutual inductance M₂ of the vario-coupler 18 as has previously been described for the circuit of Figure 1. The tangent of the loss angle of the core 40 will then be the ratio of the resistive effect of the core, as measured by the mutual inductance M₂, to the reactive effect of the core as measured by the mutual inductance M₁.

Since the circuit is adapted to measure very small impedances, only very few turns of wire need be used for the windings 38 and 42 on the core. In fact, a single "turn" is usually sufficient. This is extremely convenient when many samples of core material must be tested, as the single "turns" may readily be applied to and removed from each sample.

In physical embodiments of circuits arranged in accordance with the invention, ordinary forms of vario-couplers may be used having very few turns on their rotors. Care must be taken to avoid large capacity couplings between the various elements, and shielding should also be used to prevent the rotor of either coupler from picking up voltage from the stator of the other coupler.

A particular construction which has been used with excellent results is based on the use of wave guides at frequencies below the cut-off frequency of the guides. A specific embodiment of such a construction is shown schematically in Figure 3. Two sections of wave guide 40, 42 are shown, one being provided for each of the vario-couplers. The primary windings 12, 20 of the vario-couplers may be fixedly mounted in the guides, while the secondary windings 14, 22 may be slidably mounted to be adjustable for balancing. Since extraneous couplings are attenuated more rapidly than the desired couplings in such an arrangement, the accuracy of the device is not reduced at weak couplings.

While specific forms of the invention have been described for the purpose of simple disclosure, it is apparent that many changes could be made in the circuits shown. For example, the use of electrostatic coupling could easily be adopted in place of the electromagnetic coupling arrangements which have been described. Since many such changes could be made in the circuits shown, all within the scope and spirit of the invention, the foregoing description is to be taken only as illustrative, and not in a limiting sense.

What is claimed is:

1. An impedance measuring device comprising first and second vario-couplers each having a primary and a secondary winding, a pair of input terminals associated with said vario-couplers and adapted to be connected to a source of alternating voltage, means for connecting an impedance in circuit with the primary winding of said first vario-coupler across said input terminals, a phase-shifting circuit in parallel with said input terminals and including (1) the primary winding of said second vario-coupler and (2) means for shifting the phase of a current in said phase-shifting circuit with respect to the current in the primary winding of said first vario-coupler, a series-connected detector circuit including (1) the secondary windings of said vario-couplers and (2) means for detecting current flow in said secondary circuit, and means for supplying to said detector circuit a voltage determined by said impedance.

2. An impedance measuring device comprising first and second vario-couplers each having a primary and a secondary winding, a pair of input terminals associated with said vario-couplers and adapted to be connected to a source of alternating voltage, means for connecting an impedance in circuit with the primary winding of said first vario-coupler across said input terminals, a phase-shifting circuit in parallel with said input terminals, and including (1) the primary winding of said second vario-coupler and (2) a capacitor in parallel with said primary winding, a series-connected detector circuit including (1) the secondary windings of said vario-couplers and (2) means for detecting current flow in said secondary circuit, and means for supplying to said detector circuit a voltage determined by said impedance.

3. An impedance measuring device comprising first and second vario-couplers each having a primary and a secondary winding, a pair of input terminals associated with said vario-couplers and adapted to be connected to a source of alternating voltage, means for connecting an impedance in circuit with the primary winding of said first vario-coupler across said input terminals, a phase-shifting circuit in parallel with said input terminals and including (1) a resistor, and (2) the parallel combination of the primary winding of said second vario-coupler and a capacitor, a series-connected detector circuit including (1) the secondary windings of said vario-couplers and (2) means for detecting current flow in said detector circuit, and means for supplying to said secondary circuit a voltage determined by said impedance.

4. An impedance measuring device comprising first and second vario-couplers each having a primary and a secondary winding, a pair of input terminals associated with said vario-couplers and adapted to be connected to a source of alternating voltage, means for connecting an impedance in series with the primary winding of said first vario-coupler across said input terminals, a phase-shifting circuit in parallel with said input terminals including (1) the primary winding of said second vario coupler and (2) a capacitor in parallel with said primary winding, a series-connected detector circuit including (1) the secondary windings of said vario-couplers and (2) means for detecting current flow in said detector circuit, and means for supplying to said detector circuit a voltage corresponding to the voltage across said impedance.

5. An impedance measuring device comprising first and second vario-couplers each having a primary and a secondary winding, a pair of input terminals associated with said vario-couplers and adapted to be connected to a source of alternating voltage, means for connecting an impedance in series with the primary winding of said first vario-coupler across said input terminals, a phase-shifting circuit in parallel with said input terminals including (1) a resistor, and (2) the parallel combination of the primary winding of said second vario-coupler and a capacitor, and a series-connected detector circuit including (1) the secondary windings of said vario-couplers, (2) means for detecting current flow in said detector circuit, and (3) said impedance.

6. A device for measuring the loss angle of a paramagnetic core, said device comprising first and second vario-couplers each having a primary and a secondary winding, a pair of input terminals associated with said vario-couplers and adapted to be connected to a source of alternating voltage, an auxiliary primary winding adapted to be wound on said core and being connected in series with the primary winding of said first vario-coupler, an auxiliary secondary winding adapted to be wound on said core, a phase-shifting circuit in parallel with said input terminals including (1) the primary winding of said second vario-coupler and (2) means for shifting the phase of a current in said phase-shifting circuit with respect to the current in the primary winding of said first vario-coupler, and a series-connected detector circuit including (1) the secondary windings of said vario-couplers, (2) said auxiliary secondary winding, and (3) means for detecting current flow in said secondary circuit.

7. A device for measuring the loss angle of a paramagnetic core, said device comprising first and second vario-couplers each having a primary and a secondary winding, a pair of input terminals associated with said vario-couplers and adapted to be connected to a source of alternating voltage, an auxiliary primary winding adapted to be wound on said core and being connected in series with the primary winding of said first vario-coupler, an auxiliary secondary winding adapted to be wound on said core, a phase-shifting circuit in parallel with said input terminals including (1) the primary winding of said second vario-coupler and (2) a capacitor in parallel with said primary winding, and a series-connected detector circuit including (1) the secondary windings of said vario-couplers, (2) said auxiliary secondary winding, and (3) means for detecting current flow in said detector circuit.

8. A device for measuring the loss angle of a paramagnetic core, said device comprising first and second vario-couplers each having a primary and a secondary winding, a pair of input terminals associated with said vario-couplers and adapted to be connected to a source of alternating voltage, an auxiliary primary winding adapted to be wound on said core and being connected in series with the primary winding of said first vario-coupler, an auxiliary secondary winding adapted to be wound on said core, a phase-shifting circuit in parallel with said input terminals including (1) a resistor, and (2) the parallel combination of the primary winding of said second vario-coupler and a capacitor, and a series-connected detector circuit including (1) the secondary windings of said vario-couplers, (2) said auxiliary secondary winding, and (3) means for detecting current flow in said detector circuit.

9. A device as claimed in claim 1, and wherein each of said vario-couplers comprises a pair of coils positioned within a rectangular wave-guide, one of said coils being slidably mounted in said guide.

WALTER van B. ROBERTS.

REFERENCES CITED

The following references are of record in the file of this patent:

UNITED STATES PATENTS

| Number | Name | Date |
| --- | --- | --- |
| 1,588,539 | Fortescue | June 15, 1926 |
| 2,302,230 | Livingston | Nov. 17, 1942 |

FOREIGN PATENTS

| Number | Country | Date |
| --- | --- | --- |
| 246,963 | Great Britain | Feb. 11, 1926 |
| 338,588 | Great Britain | Nov. 21, 1930 |
| 451,094 | Great Britain | July 29, 1936 |